(12) United States Patent
Knotts

(10) Patent No.: US 6,783,101 B2
(45) Date of Patent: Aug. 31, 2004

(54) CLAMP FOR SECURING MULTIPLE, SPACED-APART TUBES

(76) Inventor: Brook H. Knotts, P.O. Box 135, Salem, UT (US) 84653

( * ) Notice: Subject to any disclaimer, the term of this patent is extended or adjusted under 35 U.S.C. 154(b) by 0 days.

(21) Appl. No.: 10/145,274

(22) Filed: May 13, 2002

(65) Prior Publication Data

US 2003/0025048 A1 Feb. 6, 2003

Related U.S. Application Data

(63) Continuation-in-part of application No. 09/626,390, filed on Jul. 26, 2000, now abandoned.

(51) Int. Cl.[7] .................................................. F16L 3/22
(52) U.S. Cl. ...................... 248/68.1; 248/74.1; 211/60.1
(58) Field of Search ................................ 248/68.1, 511, 248/512, 534, 539–541, 49, 62, 63, 65, 74.1, 253, 74.4, 74.5; 206/443; 211/60.1, 70.4, 70.6; 224/42.4, 42.38

(56) References Cited

U.S. PATENT DOCUMENTS

| | | | | |
|---|---|---|---|---|
| 2,354,919 A | * | 8/1944 | Lockwood | 248/68.1 |
| 3,526,934 A | * | 9/1970 | Owen, Sr. | 285/154.1 |
| 3,682,422 A | * | 8/1972 | Evans | 248/68.1 |
| 4,099,626 A | * | 7/1978 | Magnussen, Jr. | 211/60.1 |
| 4,199,070 A | * | 4/1980 | Magnussen, Jr. | 211/60.1 |
| 5,029,782 A | * | 7/1991 | Andre et al. | 248/68.1 |
| 5,060,810 A | * | 10/1991 | Jones | 211/59.4 |
| 5,083,372 A | * | 1/1992 | Polutnik et al. | 29/890.043 |
| 5,669,590 A | * | 9/1997 | Przewodek | 248/68.1 |
| 5,794,897 A | * | 8/1998 | Jobin et al. | 248/74.4 |
| 5,941,483 A | * | 8/1999 | Baginski | 248/68.1 |
| 5,992,802 A | * | 11/1999 | Campbell | 248/68.1 |
| 5,996,945 A | * | 12/1999 | Coles et al. | 248/68.1 |
| 6,007,029 A | * | 12/1999 | Barriger et al. | 248/68.1 |
| 6,061,880 A | * | 5/2000 | Senninger | 24/339 |
| 6,142,429 A | * | 11/2000 | Ahroni | 248/74.2 |

* cited by examiner

Primary Examiner—Jennifer E. Novosad
(74) Attorney, Agent, or Firm—Angus C. Fox, III

(57) ABSTRACT

A boiler tube clamp, for securing boiler tubes in an equal-spaced, parallel arrangement, includes a pair of mating half-clamps having multiple opposed recesses sized to snugly cradle boiler tubes of a given diameter. The half-clamps are brought together around the boiler tubes and either welded or bolted together, thereby aligning the tubes in the desired arrangement. The bolts and/or clamps used to secure together the mating half-clamps of each of the embodiments of the invention are unaffected by downward abrasive action that typically occurs in boilers. For welded-together half-clamps, the welds are on top and bottom surfaces where they are shielded from abrasive action. For bolted-together half-clamps, the bolts are protected from abrasive action by recessing the bolt heads and retaining nuts.

18 Claims, 14 Drawing Sheets

CLAMP FOR SECURING MULTIPLE, SPACED-APART TUBES

This is a continuation-in-part of application Ser. No. 09/626,390, filed on Jul. 26, 2000, and which is now abandoned.

FIELD OF THE INVENTION

The present invention relates to clamping mechanisms for securing together multiple tubes together in a mutually parallel arrangement, and a method incorporated for use with such mechanism, and more particularly, provides a new and useful structure that can avoid incorporation of guide protrusions, external C-clamps, and the like and at the same time accommodate single-person installation.

BACKGROUND OF THE INVENTION

Most power plants use steam turbines to generate electricity. A simple steam turbine power plant consists of a boiler, a steam turbine, and a condenser. Water is heated in the boiler to form steam, which is then ducted to the turbine. The turbine converts the steam's thermal energy to rotational energy, which is used to power an electric generator. The steam exhausted form the turbine is condensed to water in the condenser, and returned to the boiler where it is again converted to steam. Steam power plants can be fueled by nuclear energy or by any conventional fuel that will supply sufficient heat to the boiler. As petroleum supplies dwindle and the environmental consequences of atomic energy use become increasingly evident, the use of coal-fired power plants will, no doubt, increase. Fuel-burning steam turbine power plants typically feature boilers having an array of metal boiler tubes therein. In order to maintain the tubes in an order arrangement and to prevent them from warping if hot spots occur, or if one or more of the boiler tubes springs a leak, it is common to clamp multiple the tubes in an essentially parallel arrangement. Heretofore, many different types of clamping mechanisms have been utilized. Typically, such clamping mechanisms are comprised of a pair of mating half-clamps, which incorporate guide protuberances and cooperating apertures which aid in bringing the tubes into a proximate, mutually parallel configuration. External C-clamps are sometimes provided to pull the half-clamps together, thereby forcing the tubes into the desired parallel configuration. Installation of such clamps often requires the effort of two or more workmen.

U.S. Pat. No. 5,083,372 to Polutnik, et al. discloses a now-common, self-aligning, boiler tube clamp having parallel mating half-clamps. The half-clamps are pulled together with bolts. U.S. Pat. No. 5,060,810 to Jones discloses a similar clamping device for holding load braces on a trailer or truck structure when not in use.

Boiler tubes and the clamps which hold them in parallel configurations are subjected to amazingly harsh environments. Both the tubes and the clamps are generally fabricated from stainless steel. The ranks of boiler tubes are generally positioned vertically within a boiler chamber that is at least several stories high. For coal-fired plants, pulverized coal is introduced into an air stream, ignited as it enters the top of the boiler chamber, and exhausted as ash, carbon dioxide, water vapor and other combustion gases at the bottom of the chamber. The coal dust and coal ash are abrasive, and over time, will erode unprotected materials in the boiler chamber. Those portions of the boiler tube clamp assemblies which project a flat surface perpendicular to the air stream become coated with ash and are, thus, protected against abrasion. However, portions of the clamp assemblies which are not coated, and which are directly exposed to the burning coal dust and coal ash will erode. Surfaces of welds, bolts and nuts which are exposed to the air stream are vulnerable. If welds bolts and nuts, which are used to hold the tube clamps together, project laterally from the sides of the clamps into the air stream, they will weaken from the constant erosion, and will eventually fail.

What is needed are boiler tube clamp assemblies which are generally immune from the erosive action of the coal dust and coal ash when placed within the air stream of a boiler chamber.

SUMMARY OF THE INVENTION

The present invention is an improved boiler tube clamp, which has greatly improved immunity to erosion caused by the continual blast of burning coal dust and coal ash in a boiler. Like the boiler tube clamp of Polutnik, et al., the new clamp includes a pair of mating half-clamps having multiple opposed recesses sized to snugly cradle boiler tubes of a given diameter. The half-clamps are brought together around a plurality of boiler tubes, and fastened together either with bolts or welds so as to maintain the tubes in a parallel configuration. Several embodiments of the improved clamp are disclosed. For each embodiment, at least one fastening means is protected from erosion caused by the continual blast of burning coal dust and coal ash. All embodiments feature weldable tabs on generally planar horizontal surfaces which are perpendicular to the flow of the burning coal dust and coal ash. Coal ash, which builds up on the horizontal surfaces, protects the welds from erosion.

A first embodiment of the new clamp mechanism includes a pair of non-matching half-clamps, one of which is equipped with a plurality of slots along the upper and lower surfaces thereof. The other half-clamp is equipped with tabs which mate with the slots of the other half-clamp when both halves are brought together by tightening the screw-type fasteners. The mating locations are readily accessible, thereby allowing a weld to be placed at the junction of each slot and its mating tab. When welds are applied to the new clamp, the clamping function is unaffected by vibration. The new clamp also differs from that of Polutnik, et al. in that provision for installation of a screw-type fastener is made between each adjacent pair of tube recesses. In order to reduce the number of personnel required to install the new clamp, one of the mating half-clamps is equipped with bolt head socket at each bolt insertion location, thereby eliminating the need to hold the bolt head with a wrench while tightening a threadably-attached nut.

A second embodiment of the new clamp is similar to the first embodiment thereof, with the exception that there are no bolt holes in the half-clamps, and no bolts are used to hold to two halves together. The half-clamps are drawn together using some other clamping means and welds are used to hold both half-clamps together.

A third embodiment of the new clamp includes a pair of matching half-clamps, each of which is equipped with a plurality of tabs along the upper surface thereof and a plurality of slots along the lower surface thereof. One half-clamp may be inverted and positioned opposite another so that the tabs of each mate with the slots of the opposing half-clamp. Rather than using a socket recesses on one of the half-clamps to retain the bolt heads of the clamping screw-type fasteners, the head of each bolt may be prevented from rotating by utilizing a locking clip beneath the head of each bolt. A ganged clip may secure all bolts installed in a half-clamp, or individual clips may be employed to lock each bolt to the half-clamp.

A fourth embodiment of the new clamp is similar to the third embodiment thereof, with the exception that there are no bolt holes in the half-clamps, and no bolts are used to hold to two halves together. The half-clamps are drawn together using some other clamping means and welds are used to hold both half-clamps together.

DESCRIPTION OF THE DRAWINGS

The present invention, both as to the organization and operation of the various embodiments, may best be understood by reference to the following drawings taken in connection with the description which follows, in which.

DETAILED DESCRIPTION OF THE INVENTION

The new improved boiler tube clamp, which may be employed to clamp boiler tubes in an equal-spaced, parallel arrangement includes a pair of mating half-clamps having multiple opposed recesses sized to snugly cradle boiler tubes of a given diameter. The half-clamps are brought together around the boiler tubes and fastened together either with bolts or welds or both. The new clamp is disclosed as four primary embodiments, which will be described sequentially in reference to the attached drawings.

Figure 1:
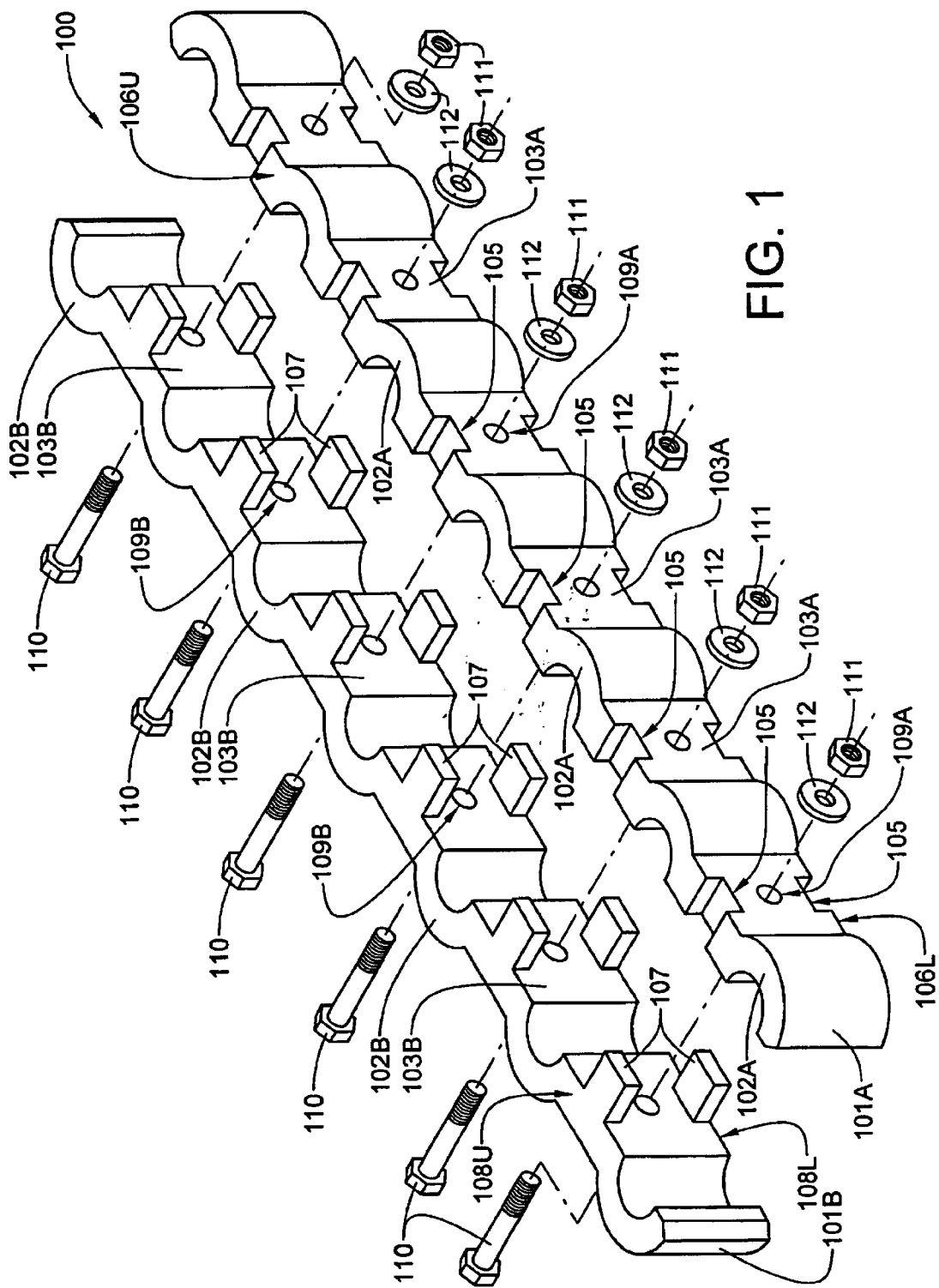
FIG. 1 is an isometric exploded view of a first embodiment of the multiple-tube clamp.

Referring now to FIG. 1, a first embodiment of the improved boiler tube clamp 100 includes first and second non-matching, elongated half-clamps 101A and 101B, respectively. Each half-clamp includes multiple, mutually spaced-apart, inwardly-curved, essentially hemi-cylindrical guides 102, each adjacent pair of guides 102 on said first half-clamp 101A being joined together by an integral medial portion 103A, and each adjacent pair of guides 102 on said second half-clamp 101B being joined together by an integral medial portion 103B, each medial portion 103A of said first half-clamp mating with a medial portion 103B of said second half-clamp when said half-clamps 101A and 101B are brought together in a clamping configuration, thereby forming a series of axially-parallel, spaced-apart, hollow cylindrical guides 202 (see FIG. 2). Half-clamp 101A is equipped with a plurality of slots 105 along the upper surface 106U and lower surface 106L thereof. The other half-clamp 101B is equipped with tabs 107 along the upper surface 108U and lower surface 108L thereof, which mate with the slots 105 of half-clamp 101A when both half-clamps (101A and 101B) are brought together in an assembled, clamping configuration. Each medial portion 103A of half-clamp 101A is equipped with a bolt-shank receiving bore 109A, which aligns with the bore 109B of a mating medial portion 103B of half-clamp 101B. A bolts 110 may be inserted in each aligned bore pairs 109A/109B. When a nut 111 is mated to each bolt 110, the half-clamps 101A and 101B may be brought together in an assembled, clamping configuration. A washer 112 may be placed beneath each nut 111. An mating junction 113 is formed along the perimeter of each slot 105 where it is adjacent a 107. The mating junctions 113 are exposed and readily accessible, thereby allowing the placement of a weld at each junction 113. When welds (see FIG. 2) are applied to the junctions 113 of the improved clamp 100, the clamping function is unaffected by vibration.

Figure 2:
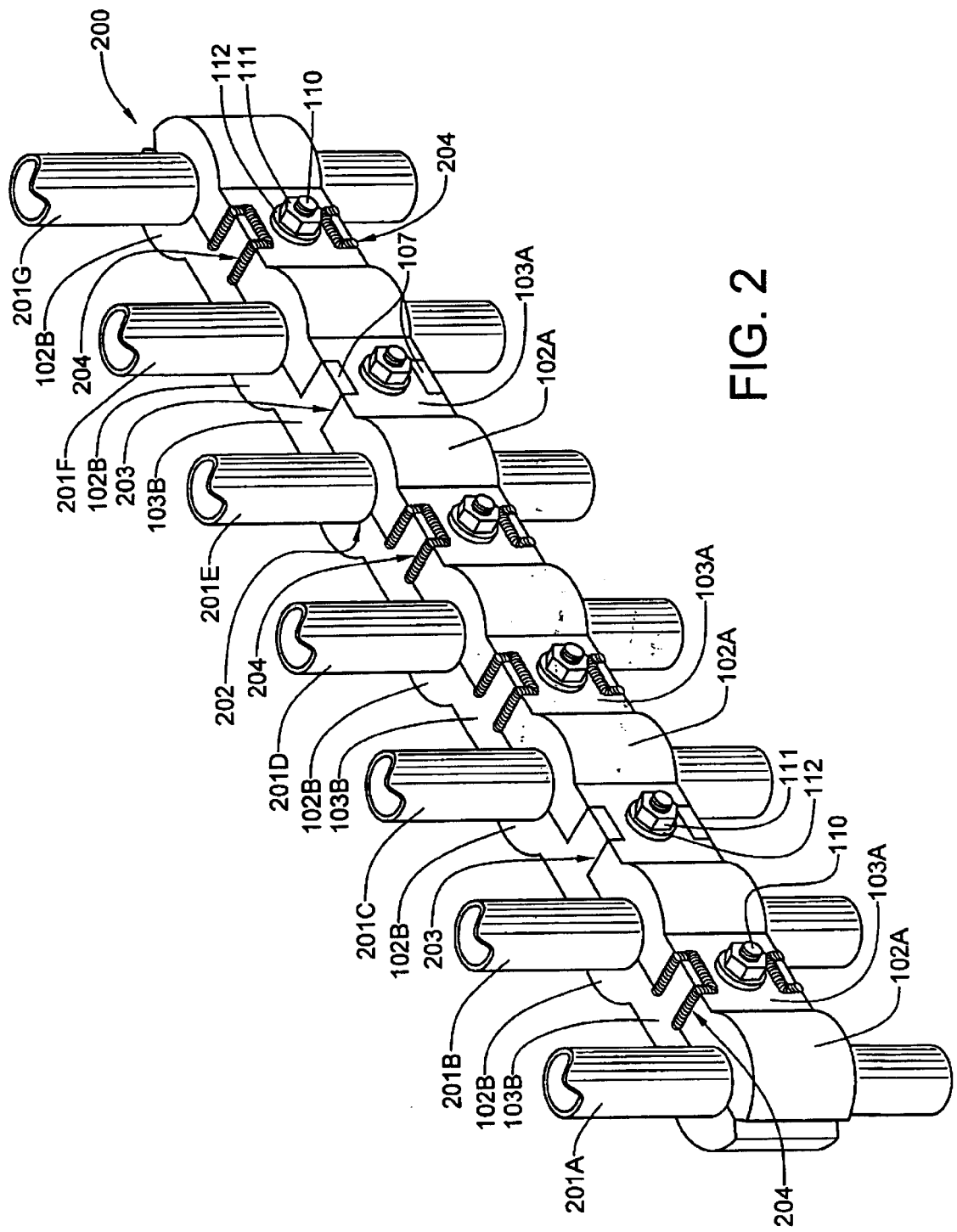
FIG. 2 is an isometric view of the clamp of FIG. 1, assembled in connection with multiple cylindrical tubes.

Referring now to FIG. 2, the two half-clamps 101A and 101B of FIG. 1 have been brought together as a clamp assembly, 200 in combination with a series of boiler tubes 201A–201G. The hemi-cylindrical guides 102A and 102B of assembled half-clamps 101A and 101B, respectively, form multiple cylindrical guides 202, within each of which a boiler tube 201A–201G is firmly clamped. The bolts 110 and nuts 111 may be employed to fasten both half-clamps 101A and 101B together. Once the two half-clamps 101A and 101B are brought together, a mating junction 203 is formed along the perimeter of each slot 105 where it is adjacent a tab 107. The mating junctions 203 are exposed and readily accessible, thereby allowing the placement of a weld 204 at each junction 203. In this drawing, a weld 204 has been placed on the mating junctions of each of the outer medial portion pairs 103N/103B and of the two middle medial portion pairs 103A/103B. When welds are applied to the junctions 203 of the improved clamp assembly 200, the clamping function is unaffected by vibration.

Figure 3:
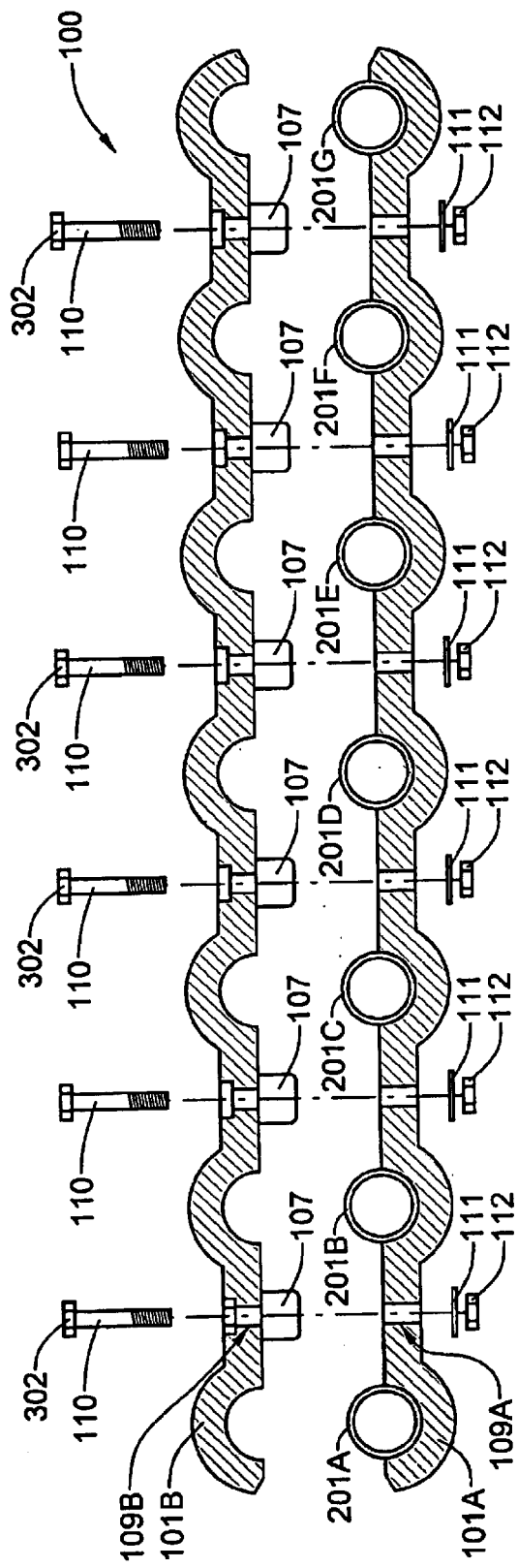
FIG. 3 is a cross-sectional view of the assembly of FIG. 2, taken through the plane ABCD, which passes through the longitudinal axes of the five bolts.

Referring now to the cross-sectional view of FIG. 3, taken through the plane ABCD of FIG. 2, which passes through the axes of bolt receiving bores 109A/109B. In order to reduce the number of personnel required to install the improved boiler tube clamp 100, the medial portions 103B of half-clamp 101B are equipped with a non-circular, bolt-head receiving socket 301 aligned to a bolt-shank receiving bore 109B, thereby eliminating the need to hold the bolt head 302 with a wrench while tightening a threadably-attached nut 111.

Figure 4:
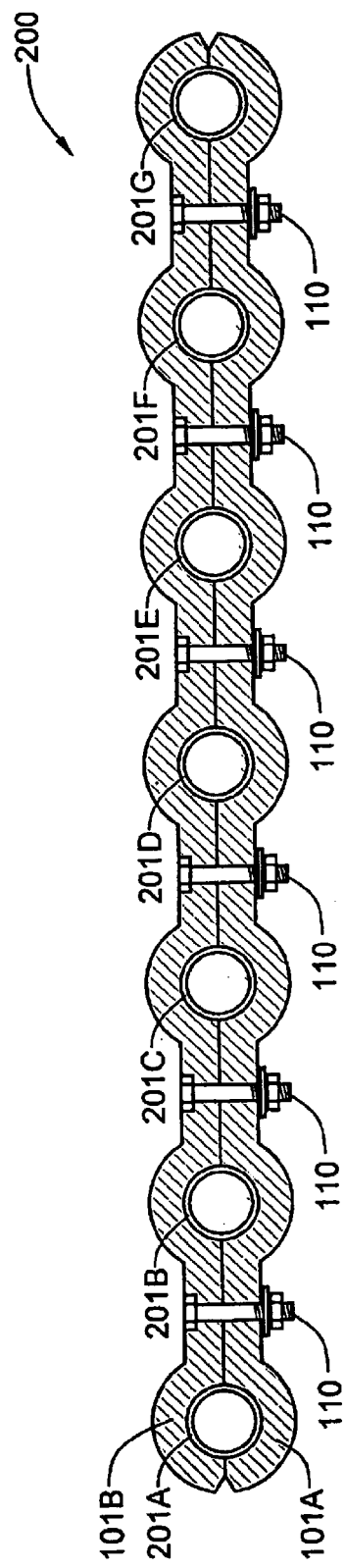
FIG. 4 is a cross-sectional exploded view of the assembly of FIG. 3.

Referring now to FIG. 4, the assembly of FIG. 3 is shown in an exploded view. Tubes 201A–201F are viewed parallel to their axes. The elements identified in this view have been heretofore described in reference to FIG. 1, 2 or 3.

Figure 5:
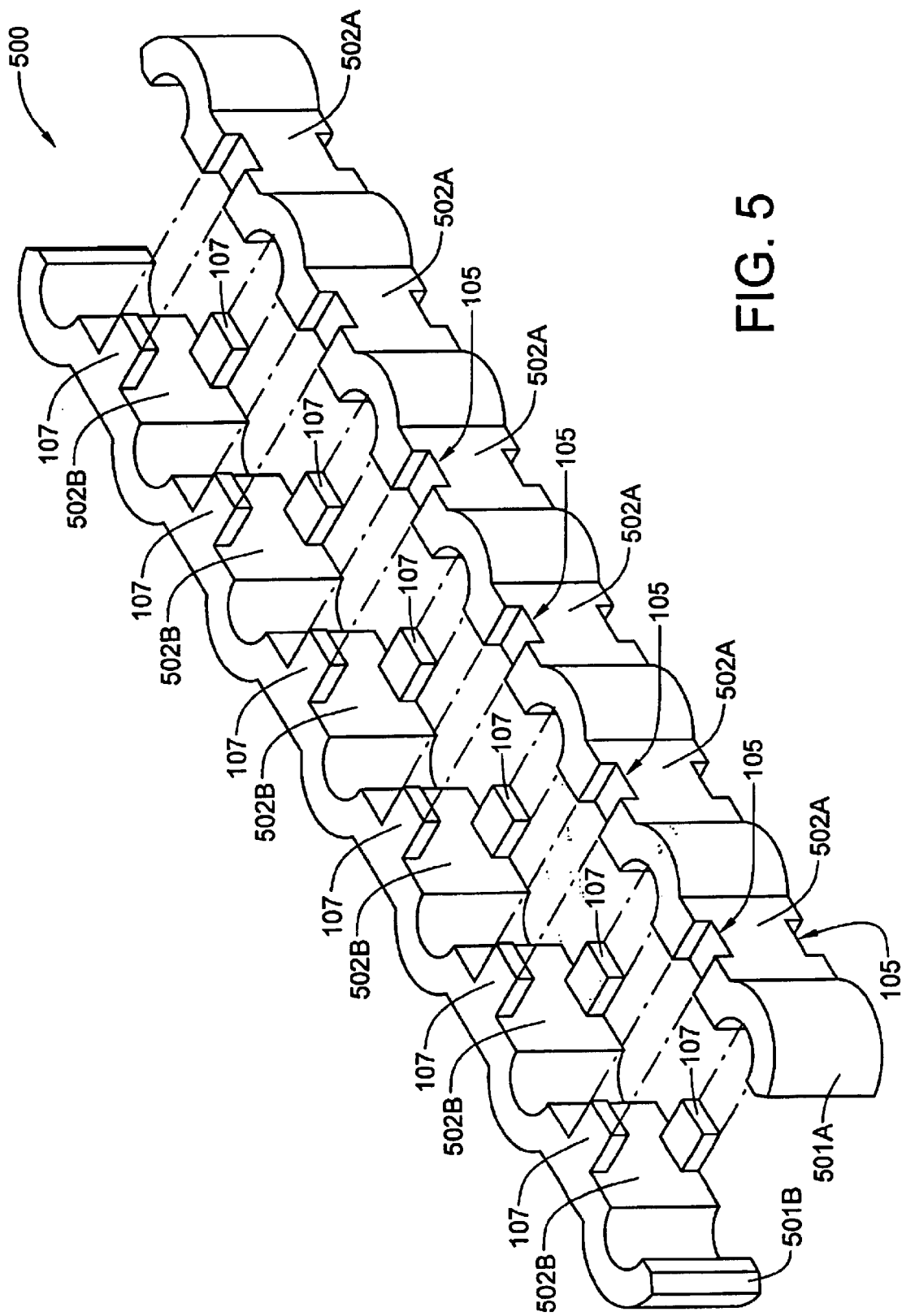
FIG. 5 is an isometric exploded view of a second embodiment of the multiple-tube clamp.

Referring now to FIG. 5, a second embodiment of the improved boiler tube clamp 500 is identical to the first embodiment clamp 100, with the exception that there are no bolt shank receiving bores 109A or 109B in the medial portions 502 of each half clamp 501A and 502B. The half-clamps 501A and 501B are drawn together using some other clamping means (e.g., C-clamps) and welds are employed to hold the assembled half-clamps together.

Figure 6:
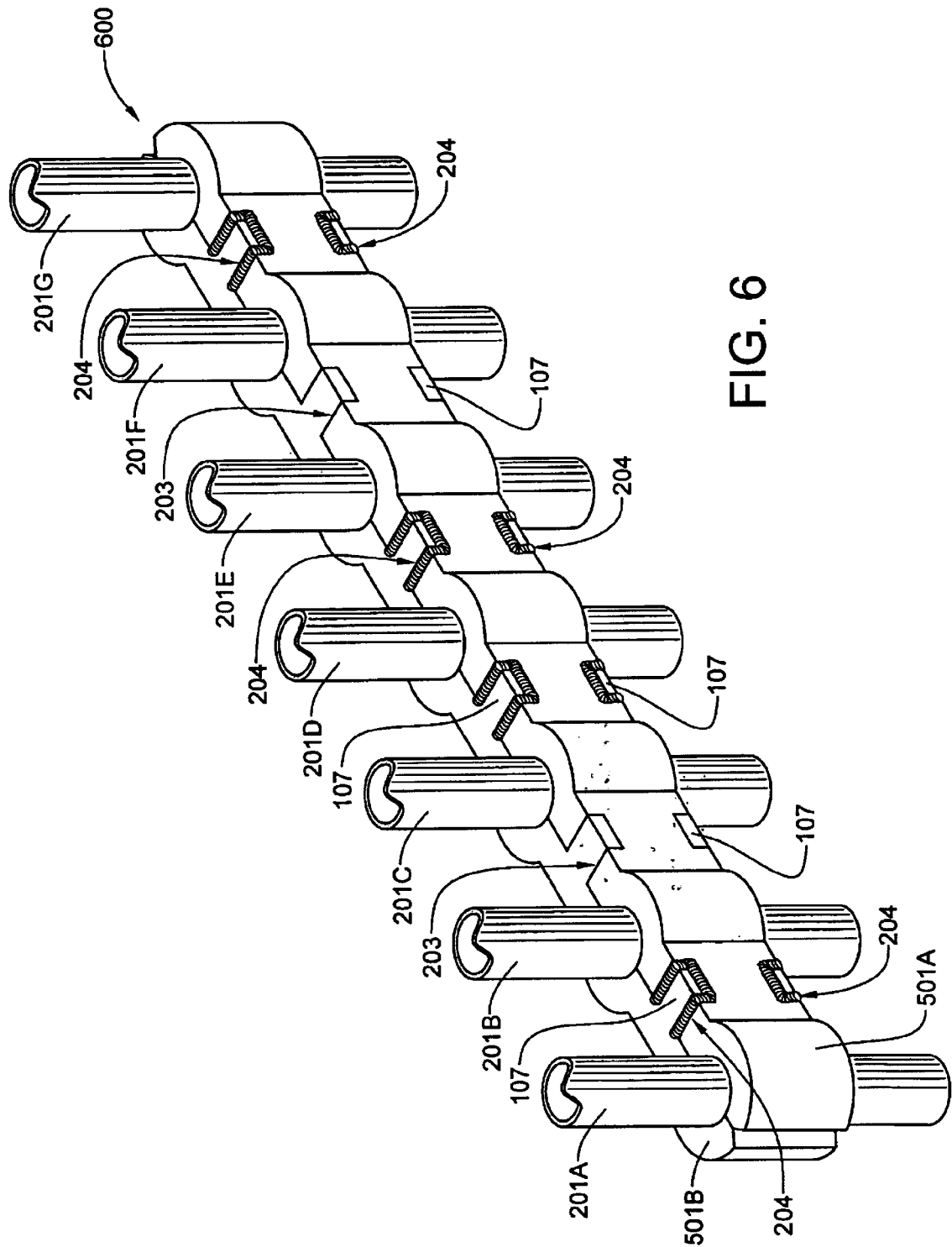
FIG. 6 is an isometric view of the clamp of FIG. 5, assembled in connection with multiple cylindrical tubes.

Referring now to FIG. 6, the two half-clamps 501A and 501B of FIG. 5 have been brought together in an assembled configuration in combination with a series of boiler tubes 201A–201F. A weld 114 has been placed at each mating junction 113.

Figure 7:
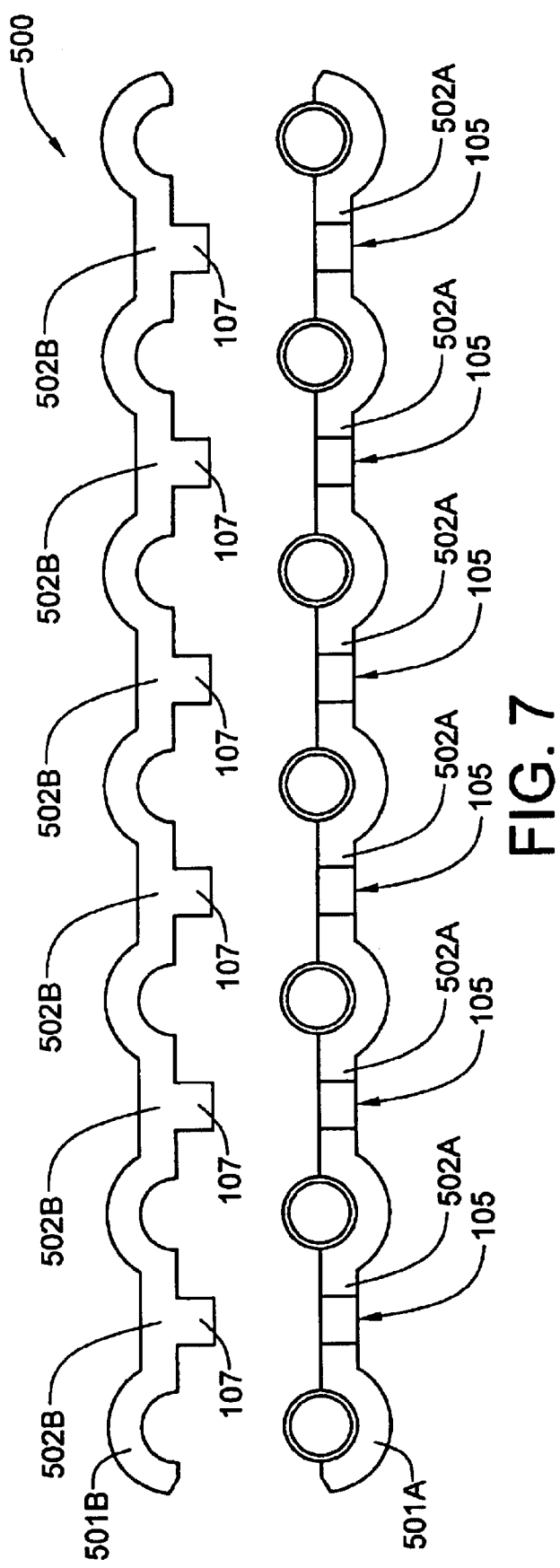
FIG. 7 is a top plan view of the assembly of FIG. 6.

Referring now to FIG. 7, the top plan view of the assembly of FIG. 6 shows the boiler tubes 201A–201F in an axially parallel and aligned configuration. Welds 114 are also visible in this view.

Figure 8:
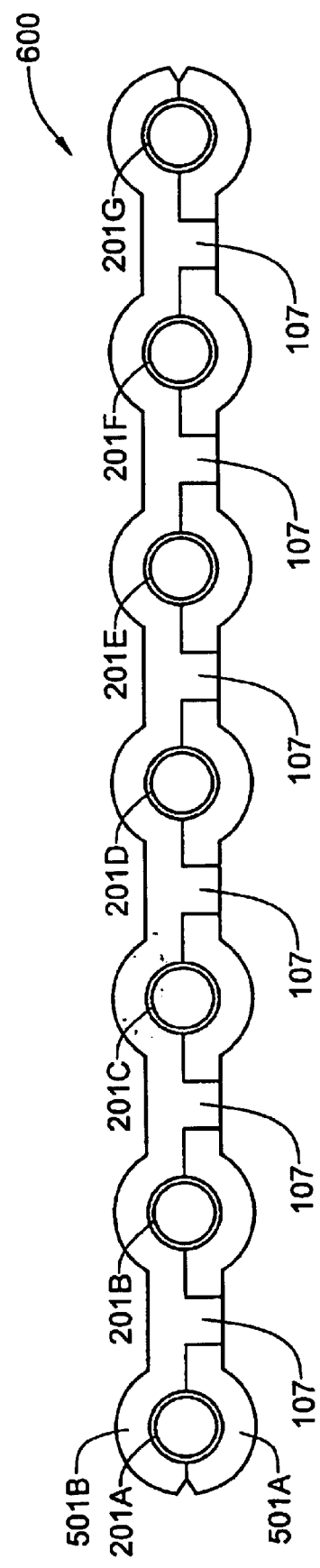
FIG. 8 is a top plan exploded view of the assembly of FIG. 7.

Referring now to FIG. 8, the assembly of FIG. 7 is shown prior to assembly in an exploded view. Of course, no welds are shown in this state of assembly.

Figure 9:
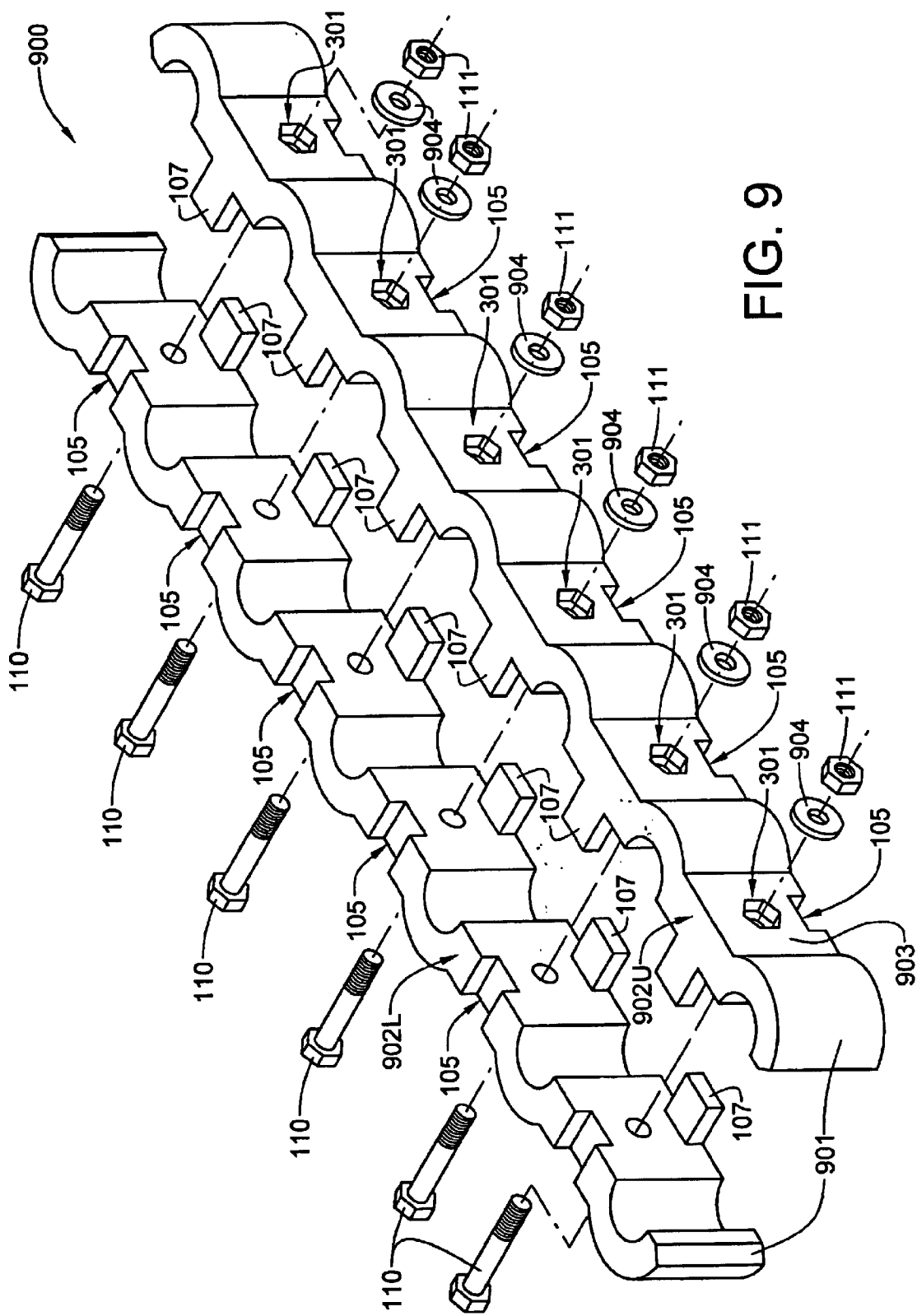
FIG. 9 is an isometric exploded view of a third embodiment of the multiple-tube clamp.

Referring now to FIG. 9, a third embodiment of the improved clamp 900 includes a pair of matching half-clamps 901, each of which is equipped with a plurality of tabs 107 along the upper surface 902U thereof and a plurality of slots 105 along the lower surface 902L thereof. One half-clamp 901 may be inverted and positioned opposite the other so that the tabs 107 of each mate with the slots 105 of the opposing half-clamp 901. Because identical half-clamps 901 are employed in pairs, it is desirable to have a bolt-head receiving socket 301 on each medial portion 903. It will be noted that a washer 904 larger in diameter than the bolt-head receiving socket 301 is placed beneath each nut 111. The large washer 904 spans, or bridges the socket 301 so that the socket 301 does not interfere with the tightening of the nut 111. Alternatively, a bolt-head locking clip (not shown) may be placed beneath the head of each bolt. The clips may either be ganged together or each may be shaped so as to lock the bolt head against the medial portion. Using either technique, both of which are common in the mechanical arts, the bolts 110 may be prevented from turning as the nuts 111 are tightened thereon.

Figure 10:
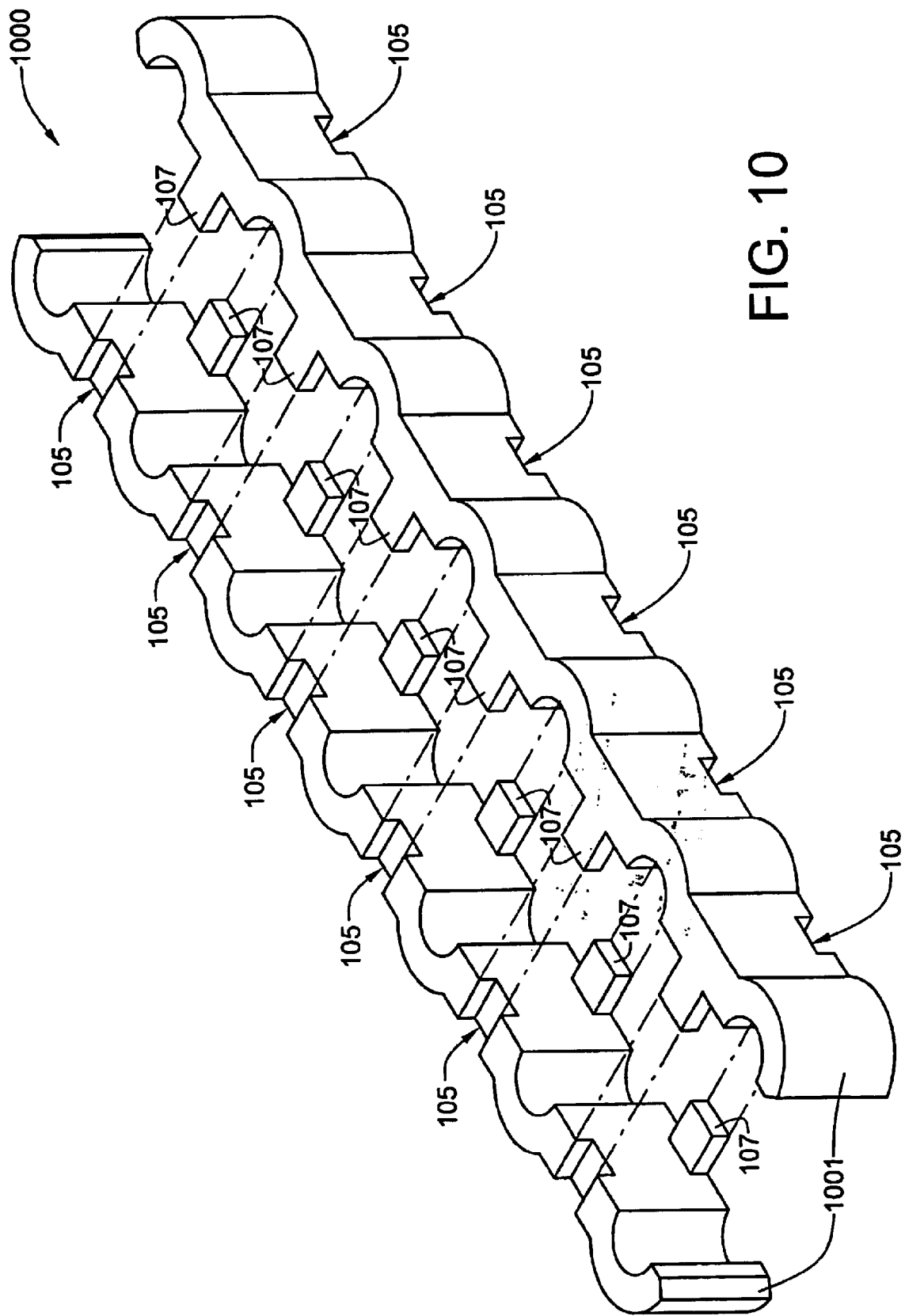
FIG. 10 is an isometric exploded view of a fourth embodiment of the multiple-tube clamp.

Referring now to FIG. 10, a fourth embodiment of the improved clamp 1000 is similar to the third embodiment depicted in FIG. 9, with the exception that there are no bolt holes in the identical half-clamps 1001, and no bolts are used to hold to two halves together. The half-clamps are drawn together using some other clamping means and welds are used to hold both half-clamps together. Welds (not shown in this Figure) are employed to physically join both half-clamps 1001 at mating junctions 113 formed between slots 105 and tabs 107.

Figure 11:
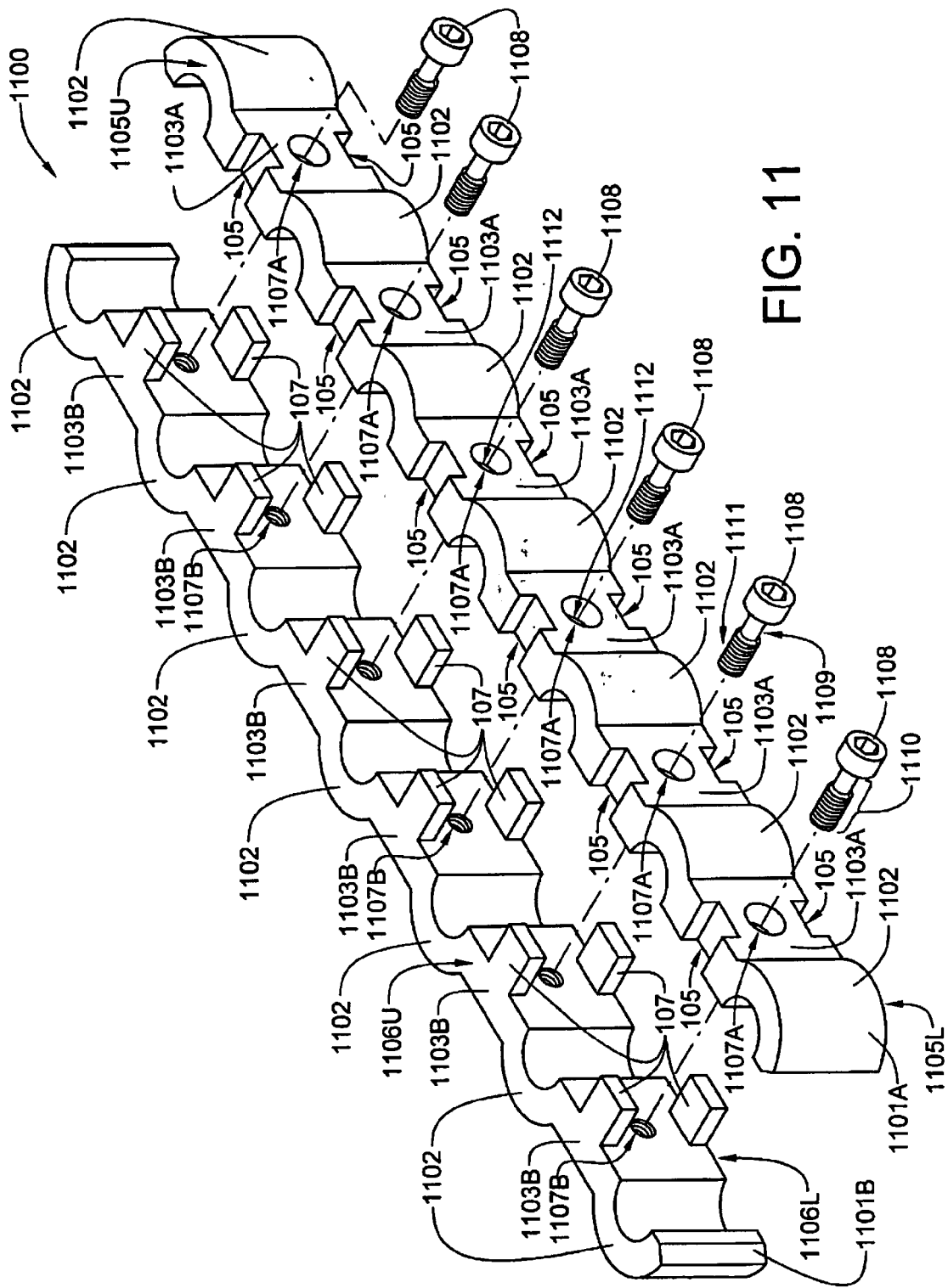
FIG. 11 is an isometric exploded view of a fifth embodiment of the multiple-tube clamp.

Referring now to FIG. 11, a fifth embodiment of the improved clamp includes first and second non-matching, elongated half-clamps 1101A and 1101B, respectively. Each half-clamp includes multiple, mutually spaced-apart, inwardly-curved, essentially hemi-cylindrical guides 1102, each adjacent pair of guides 1102 on said first half-clamp 1101A being joined together by an integral medial portion 1103A, and each adjacent pair of guides 1102 on said second half-clamp 1101B being joined together by an integral medial portion 1103B, each medial portion 1103A of said first half-clamp mating with a medial portion 1103B of said second half-clamp when said half-clamps 1101A and 1101B are brought together in a clamping configuration, thereby forming a series of axially-parallel, spaced-apart, hollow cylindrical guides 1202 (see FIG. 2). Half-clamp 1101A is equipped with a plurality of slots 1105 along the upper surface 1106U and lower surface 1106L thereof. The other half-clamp 1101B is equipped with tabs 1107 along the upper surface 1108U and lower surface 1108L thereof, which mate with the slots 1105 of half-clamp 1101A when both half-clamps (1101A and 1101B) are brought together in an assembled, clamping configuration. Each medial portion 1103A of half-clamp 1101A is equipped with a bolt-shank receiving bore 1109A, which aligns with the threaded bore 1109B of a mating medial portion 1103B of half-clamp 1101B. A bolt 1110 may be inserted through each bolt-shank receiving bore 1109A in half-clamp 1101B and secured in a threaded bore 1109B of half-clamp 1101B. It will be noted that each bolt 1110 is termed a stretch bolt. That is, the unthreaded part 1113 of the bolt shank 1114 is of reduced diameter, so that when the threaded part 1115 of the shank 1114 is torqued during tightening, the unthreaded part 1113 will stretch. This has a tendency to lock the bolt in the bore. This feature, coupled with a serrated head bearing surface (shown in FIG. 13) which bears against the seat 1116 of a receiving bore 1109A, ensures that the bolt, when tightened to its specified torque rating, will not vibrate loose.

Figure 12:
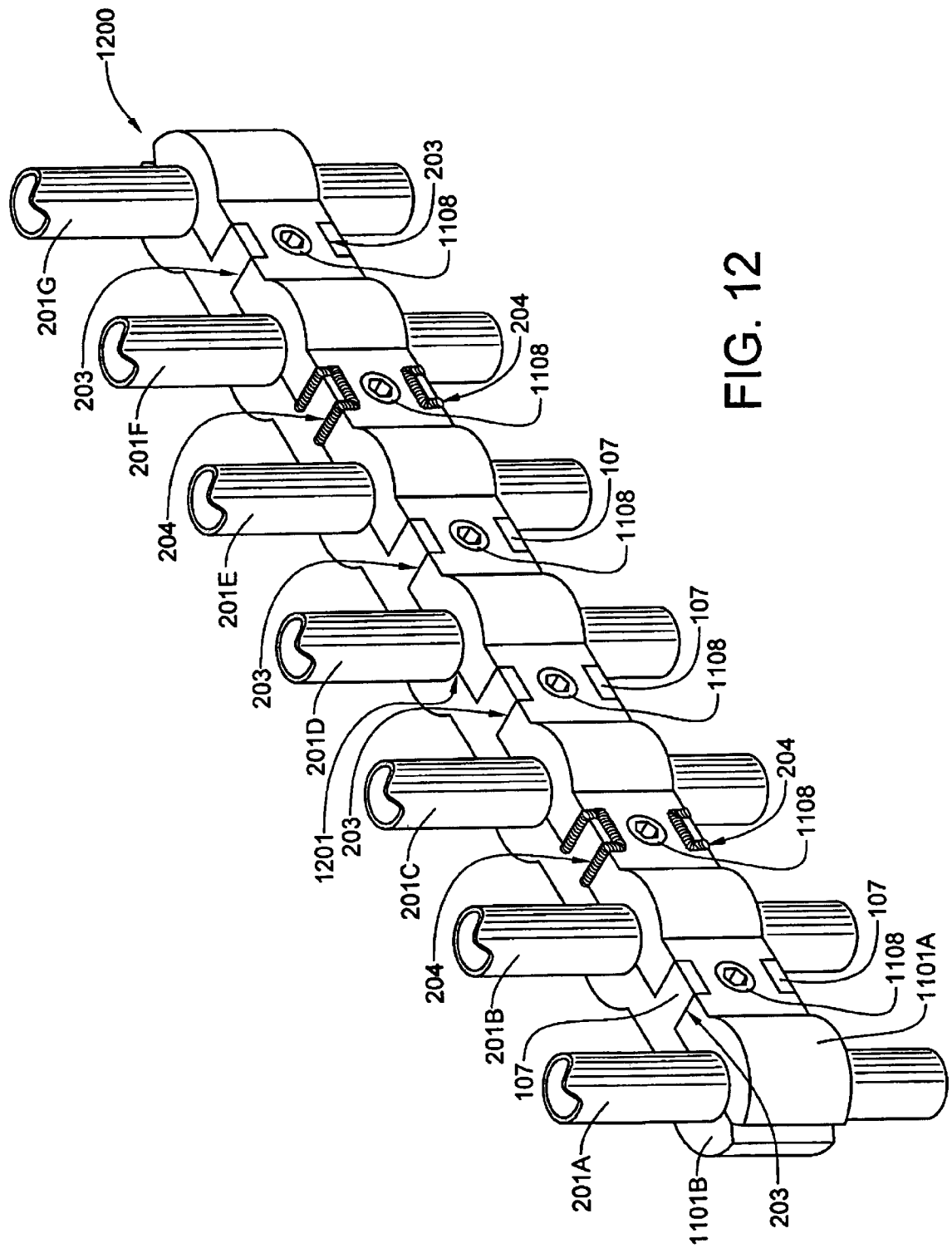
FIG. 12 is an isometric view of the clamp of FIG. 11, assembled in connection with multiple cylindrical tubes.

Referring now to FIG. 12, the two half-clamps 1101A and 1101B of FIG. 11 have been brought together in clamp assembly 1200 in combination with a series of boiler tubes 201A–201G (see FIG. 2 of the original hand-drawn drawing figures). The hemi-cylindrical guides 1102 of assembled half-clamps 1101A and 1101B form multiple cylindrical guides 1201, within each of which a boiler tube 201Ak, 201B, 201C, 201D, 201E, 201F or 201G is firmly clamped. The bolts 1110 may be employed to fasten both half-clamps 1101A and 1101B together. A mating junction 203 is formed along the perimeter of each slot 105 where it is adjacent a tab 107. The mating junctions 203 are exposed and readily accessible, thereby allowing the placement of a weld 204 at each junction 203. When welds 204 are applied to multiple junctions 203 of the improved clamp 1100, the half-clamps 1101A and 1101B become a single unit and will not separate under normal operational conditions. It will be noted that, as a large portion of each weld 204 in on a horizontal surface of the clamp, it will be largely unaffected by erosion caused by the blast of burning coal dust and coal ash against it when installed within a power plant boiler.

Figure 13:
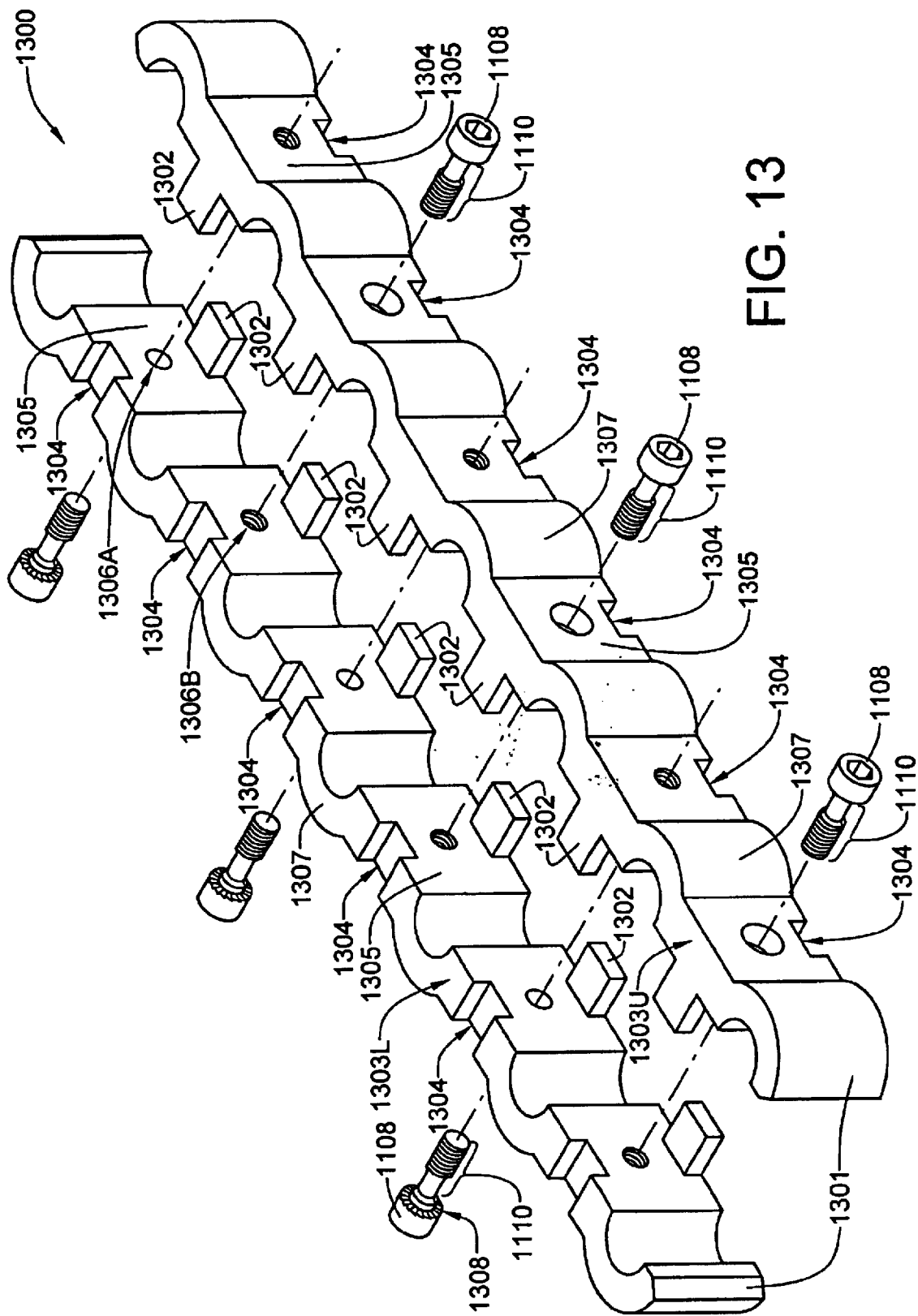
FIG. 13 is an isometric exploded view of a sixth embodiment of the multiple-tube clamp.

Referring now to FIG. 13, a sixth embodiment of the improved clamp 1300 includes a pair of matching half-clamps 1301, each of which is equipped with a plurality of tabs 1302 along the upper surface 1303U thereof and a plurality of slots 1304 along the lower surface 1303L thereof. One half-clamp 1301 may be inverted and positioned opposite the other so that the tabs 1302 of each mate with the slots 1304 of the opposing half-clamp 1301. Because identical half-clamps 1301 are employed in pairs, each medial portion 1305 is alternately equipped with either a bolt-shank receiving bore 1306A or threaded bore 1306B, so that when a pair of the half-clamps 1301 are brought together, a bolt 1105 may be inserted into every other medial portion 1305 of each half clamp 1301. For this arrangement to be successful, an even number of medial portions 1305 and an odd number of tube guides 1307 are required. It will be noted that as with the fifth embodiment of the invention, stretch bolts having serrated head bearing surfaces 1308 are employed to lock the bolts in the bores 1306A/1306B when torqued to proper specifications.

Figure 14:
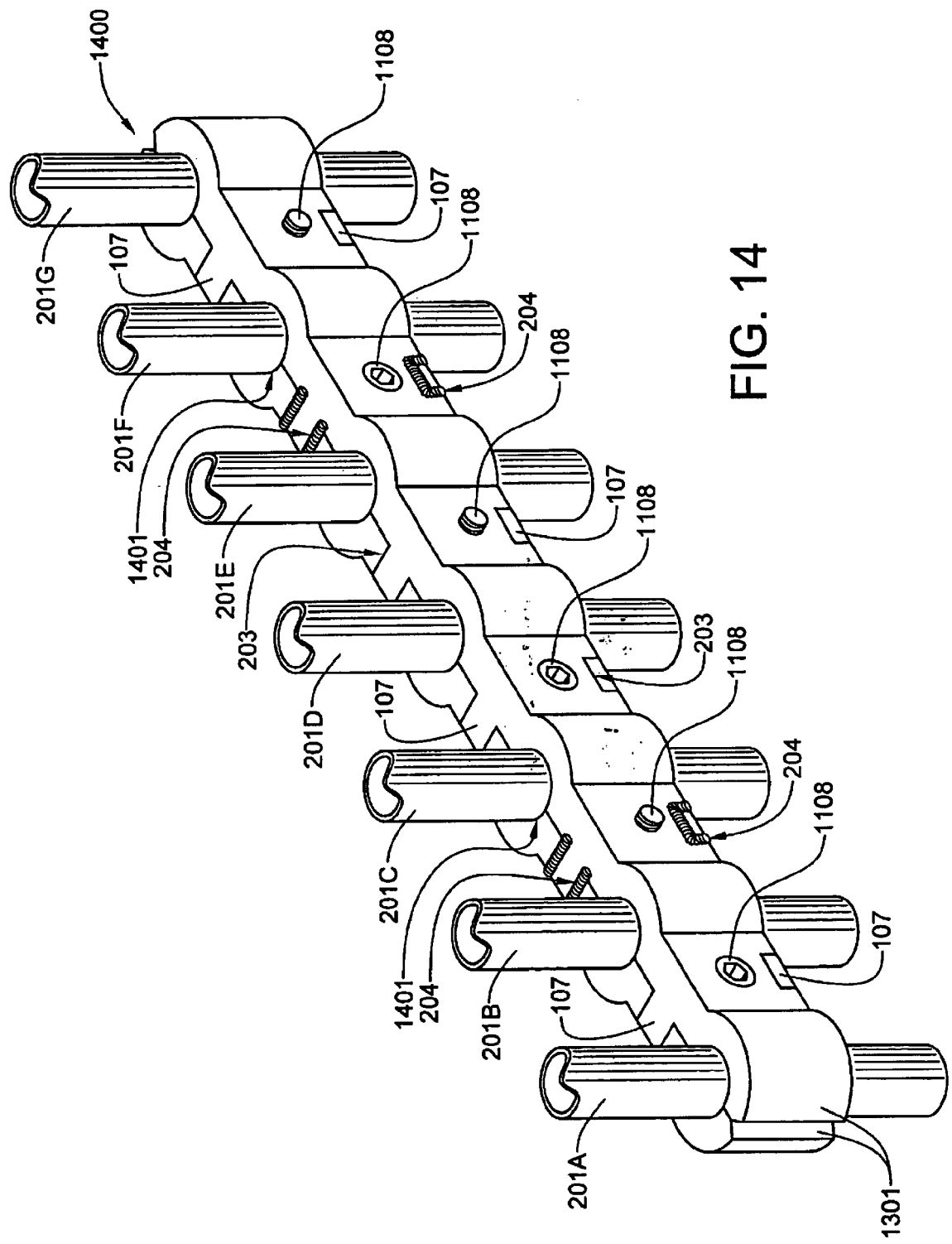
FIG. 14 is an isometric view of the clamp of FIG. 13, assembled in connection with multiple cylindrical tubes.

Referring now to FIG. 14 the two half-clamps 1301A and 1301B of FIG. 13 have been brought together in a clamp assembly 1400 in combination with a series of boiler tubes 201A–201G. The hemi-cylindrical guides 1307 of assembled half-clamps 1301A and 1301B form multiple cylindrical guides 1401, within each of which a boiler tube 201Ak, 201B, 201C, 201D, 201E, 201F or 201G may firmly clamped. A mating junction 203 is formed along the perimeter of each tab 107 where it is adjacent a slot 105. The mating junctions 203 are exposed and readily accessible, thereby allowing the placement of a weld 204 at each junction 203. When welds are applied to the junctions 203 of the improved clamp 1300, the half-clamps 1301A and 1301B become a single unit and will not separate under normal operational conditions.

Figure 15:
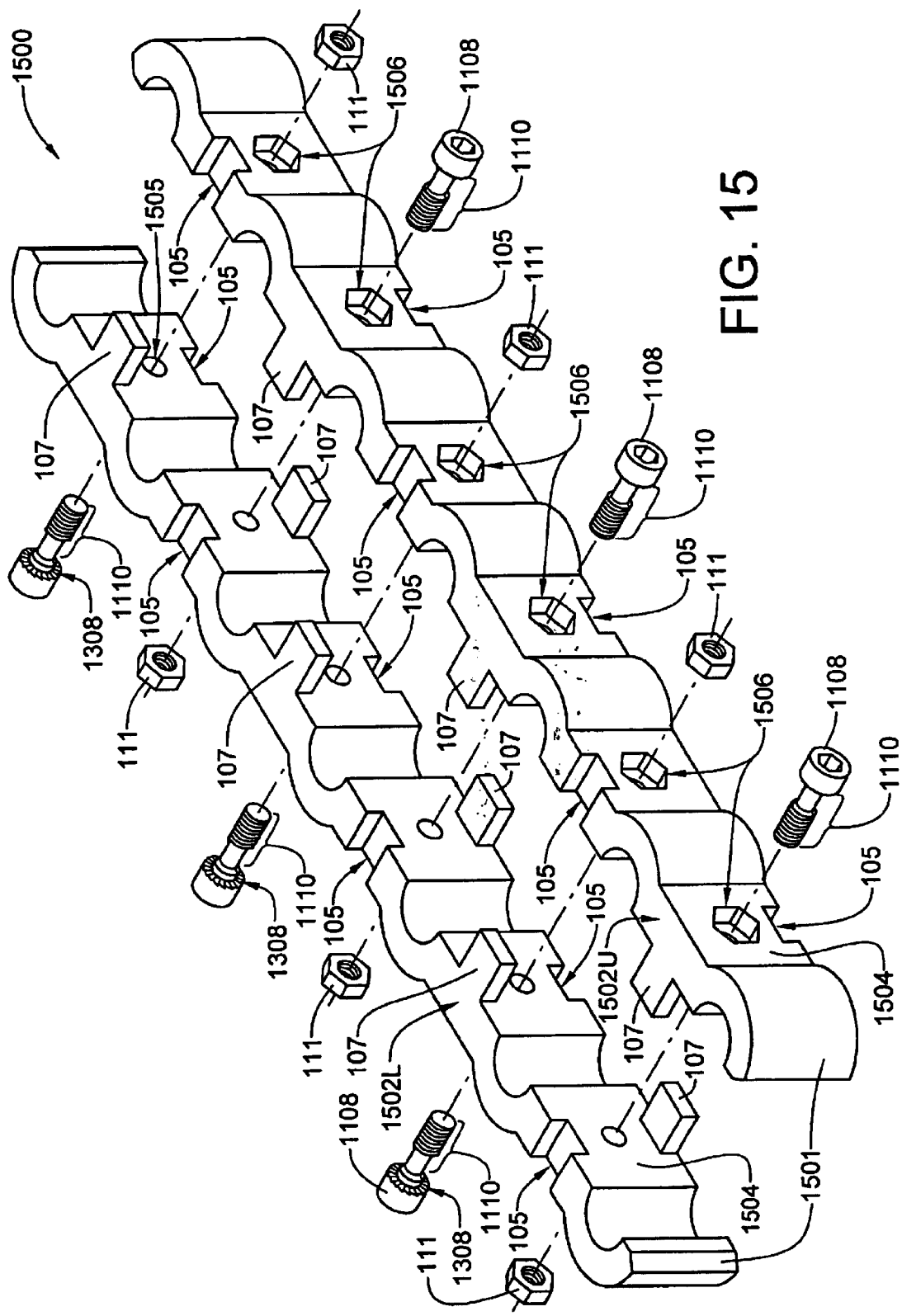
FIG. 15 is an isometric exploded view of a seventh embodiment of the multiple-tube clamp.

Referring now to FIG. 15, a seventh embodiment of the improved clamp 1500 includes a pair of matching half-clamps 1501, each of which is equipped with a plurality of alternating tabs 1502 on the upper and lower surfaces 1503U and 1503L of the medial portions 1504 thereof. This embodiment is different from the others in that each bolt-shank receiving bore 1505 is equipped with a nut recess 1506 which can double as a bolt head recess. A serrated head bear surface 1308 on each bolt 1110 is employed to lock each bolt in its respective bore 1505. Each nut 111, of course, is locked in place by the nut recess 1506. The bolts may be inserted from either direction.

Figure 16:
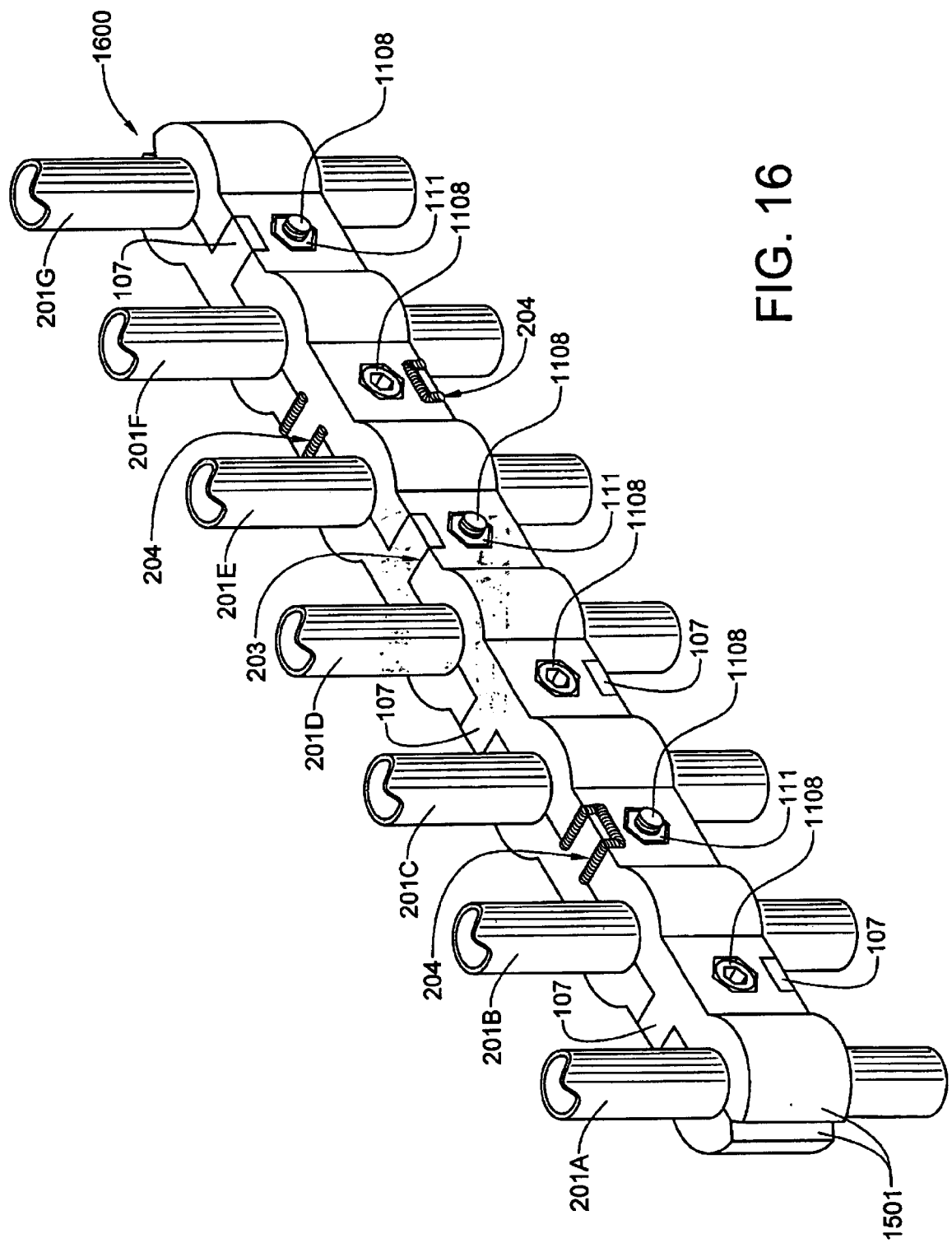
FIG. 16 is an isometric view of the clamp of FIG. 15, assembled in connection with multiple cylindrical tubes.

Referring now to FIG. 16, the two half-clamps 1501 of FIG. 15 have been brought together in an assembled configuration in combination with a series of boiler tubes 201A–201F (see FIG. 2 of the original hand-drawn drawing figures). The hemi-cylindrical guides 1601 of assembled half-clamps 1501 form multiple cylindrical guides 1502, within each of which a boiler tube 201 (see FIG. 2) may firmly clamped. A mating junction 1603 is formed along the perimeter of each tab 1502 where it is adjacent a slot 1504. The mating junctions 1603 are exposed and readily accessible, thereby allowing the placement of a weld 1604 at each junction 1603. When welds (identical to those in FIG. 1) are applied to the junctions 1603 of the improved clamp 1500, the half-clamps 1501 become a single unit and will not separate under normal operational conditions.

Although only several embodiments of the invention have been heretofore described, it will be obvious to those having ordinary skill in the art that changes and modifications may be made thereto without departing from the scope and the spirit of the invention as hereinafter claimed.

What is claimed is:

1. A clamp comprising:

first and second opposed, elongated half-clamps each having a plurality of mutually spaced-apart, inwardly-curved, essentially hemi-cylindrical guides, each pair of adjacent guides being joined together by an integral medial portion, each medial portion of said first half-clamp mating with a medial portion of said second half-clamp when said half-clamps are brought together in a clamping configuration, thereby forming a series of axially parallel, spaced-apart, hollow cylindrical guides, within each of which a single tube can be maintained in a fixed position, each pair of opposed medial portions having a pair of tabs and a pair of slots, each tab engaging one of the slots to provide an exposed junction at each tab-slot interface when the half-clamps are brought together in the clamping configuration, said junction being weldable so as to physically unify both half-clamps, wherein all of said tabs and slots are positioned along upper or lower exterior surfaces of a half-clamp, said surfaces being essentially perpendicular to the axes of the cylindrical guides.

2. The clamp of claim 1, wherein the medial portions of at least one half-clamp respectively each include a non-circular, bolt-head receiving socket and a bolt-shank receiving bore aligned and contiguous with said socket, said medial portions of the other half-clamp having respective bolt-shank receiving bores which align with the bolt-shank bores of said at least one half-clamp when both half-clamps are brought together in the clamping configuration.

3. The clamp of claim 2, which further comprises a plurality of threaded bolts and mating nuts corresponding in number to the number of bolt-shank receiving bores in the at least one half-clamp, each bolt having a head which conforms in size and seats within a receiving socket, and a shank sized to pass through a corresponding one of said bolt-shank receiving bores, said bolts and the respective mating nuts employable to maintain the two half-clamps in the clamping configuration.

4. The clamp of claim 2, wherein each half-clamp is identical to one another, and the medial portions of each half-clamp include a non-circular, bolt-head receiving socket and a bolt-shank receiving bore aligned and contiguous with said socket, and each medial portion of each half-clamp has both a tab and a slot, the tabs and slots of each half-clamp being arrayed in a row, such that when a pair of half-clamps are brought together in the clamping configuration, the tabs of one half-clamp mate with the slots of the other half-clamp.

5. The clamp of claim 4, which further comprises a plurality of threaded bolts, mating nuts and flat washers corresponding in number to the number of bolt-shank receiving bores in at least one half-clamp, each bolt having a head which conforms in size with and seats within a receiving socket, and a shank sized to pass through said bolt-shank receiving bores, a washer being positioned beneath each nut, each washer being of sufficient diameter so that it spans an unfilled bolt-head-receiving socket proximate each nut as the that nut is threadably tightened on a bolt passing through the unfilled bolt-head-receiving socket.

6. The clamp of claim 1, wherein each half-clamp is identical to one another, the medial portions of each half-clamp have both a tab and a slot, and the tabs and slots of each half-clamp are arrayed in separate rows, such that when a pair of half-clamps are brought together in the clamping configuration, with one half-clamp inverted with respect to the other, the tabs of one half-clamp mate with the slots of the other half-clamp.

7. The clamp of claim 1, wherein each half-clamp is identical to one another, and the tabs and slots of each half-clamp are arranged such that when a pair of half-clamps are brought together in the clamping configuration, with one half-clamp inverted with respect to the other, the tabs of one half-clamp mate with the slots of the other half-clamp.

8. The clamp of claim 1, wherein said tabs and slots are essentially rectangular in shape.

9. In combination with a series of axially-parallel, spaced-apart tubes having similar diameters, a clamp comprising:

first and second opposed, elongated half-clamps mated together, thereby enclosing the tubes, each half-clamp having a plurality of parallel, mutually spaced-apart grooved half-guides, each adjacent half-guide pair being joined together by an integral medial portion, each medial portion of said first half-clamp respectively mated with a medial portion of said second half-clamp, thereby forming a series of axially parallel, spaced-apart guides in which the tubes are securely maintained, each pair of opposed medial portions having a pair of tabs and a pair of slots, each tab engaging a slot to provide a weldable junction at the slot-tab interface for physically unifying the mated half-clamps, said weldable junction being positioned principally on an upper or lower exterior surface of the clamp.

10. The combination of claim 9, wherein the medial portions of at least one of the half-clamps respectively each include a non-circular, bolt-head receiving socket and a bolt-shank receiving bore aligned and contiguous with said socket, said medial portions of the other half-clamp having respective bolt-shank receiving bores which align with the bolt-shank bores of the other mated half-clamp.

11. The combination of claim 10, which further comprises a plurality of threaded bolts and mating nuts corresponding in number to the number of bolt-shank receiving bores in the at least one half-clamp, each bolt having a head which conforms in size and seats within a receiving socket, and a shank sized to pass through a corresponding one of said bolt-shank receiving bores, said bolts and the respective mating nuts employable to secure together the two mated half-clamps.

12. The combination of claim 10, wherein each half-clamp is identical, and the medial portions of each half-clamp include a non-circular, bolt-head receiving socket and a bolt-shank receiving bore aligned and contiguous with said socket, and when the second half-clamp is inverted with respect to the first half-clamp, the tabs and slots of each half-clamp are arranged such that the tabs of the first half-clamp mate with the slots of the second half-clamp.

13. The combination of claim 12, which further comprises a plurality of threaded bolts, mating nuts and flat washers corresponding in number to the number of bolt-shank receiving bores in at least one half-clamp, each bolt having a head which conforms in size and seats within a receiving socket, and a shank sized to pass through said bolt-shank receiving bores, a washer being positioned beneath each nut, each washer being of sufficient diameter so that it spans an unfilled bolt-head-receiving socket proximate each nut as that nut is threadably tightened on a bolt passing through the unfilled bolt-head-receiving socket.

14. The combination of claim 9, wherein each half-clamp is identical to one another, the medial portions of each half-clamp have both a tab and a slot, the tabs and slots of each half-clamp are arrayed in separate rows, and one half-clamp is inverted with respect to the other so that the tabs of one half-clamp mate with the slots of the other half-clamp.

15. The combination of claim 9, wherein said tabs and slots are essentially rectangular in shape.

16. A clamp comprising:

first and second opposed, half-clamps each having a plurality of mutually spaced-apart, grooved half-guides, each adjacent half-guide pair being joined together by an integral medial portion, each medial portion of said first half-clamp mating with a medial portion of said second half-clamp when said half-clamps are brought together in a clamping configuration, thereby forming a series of parallel, spaced-apart guides, within each of which a single tube can be maintained in a fixed position, each pair of opposed medial portions having a pair of tabs and a pair of exposed slots, each tab engaging a slot to provide an exposed junction at each tab-slot interface when the half-clamps are brought together in the clamping configuration, said junction being weldable so as to physically unify both half-clamps, wherein all of said tabs and slots are positioned along upper or lower exterior surfaces of a half-clamp, each of said spaced-apart guides interconnecting said upper and lower surfaces.

17. The clamp of claim 16, wherein each grooved half-guide is essentially hemi-cylindrically shaped, and each of the plurality of guides formed by bringing the two half-clamps together into a clamping configuration is an essentially cylindrical bore, said plurality of guides being mutually axially parallel.

18. The clamp of claim 16, wherein the medial portions of at least one half-clamp respectively each include a non-circular, bolt-head receiving socket and a bolt-shank receiving bore aligned and contiguous with said socket, said medial portions of the other half-clamp having respective bolt-shank receiving bores which align with the bolt-shank bores of the other half-clamp when the half-clamps are brought together in the clamping configuration, said clamp further comprising a plurality of threaded bolts and mating nuts corresponding in number to the number of bolt-shank receiving bores in said at least one half-clamp, each bolt having a head which conforms in size and seats within a receiving socket, and a shank sized to pass through said bolt-shank receiving bores, said bolts and the respective mating nuts employable to maintain the half-clamps in the clamping configuration.

* * * * *